United States Patent [19]

Wolfe

[11] Patent Number: 4,908,777
[45] Date of Patent: Mar. 13, 1990

[54] ROBOT ARM CALIBRATION SYSTEM

[75] Inventor: Samuel J. Wolfe, Boulder, Colo.

[73] Assignee: Storage Technology Corporation, Louisville, Colo.

[21] Appl. No.: 148,617

[22] Filed: Jan. 27, 1988

[51] Int. Cl.$^4$ .............................................. G05B 19/42
[52] U.S. Cl. .................................... 364/513; 364/182; 901/46; 901/50
[58] Field of Search ................ 364/513, 182; 318/568; 901/46, 50

[56] References Cited

U.S. PATENT DOCUMENTS

| | | | |
|---|---|---|---|
| 4,362,977 | 12/1982 | Evans et al. | 318/568 |
| 4,362,978 | 12/1982 | Pollard | 318/568 |
| 4,481,592 | 11/1984 | Jacobs et al. | 364/513 |
| 4,531,192 | 7/1985 | Cook | 364/513 |
| 4,547,858 | 10/1985 | Horak | 364/513 |
| 4,581,566 | 4/1986 | Ekstrom | 318/568 |
| 4,594,670 | 6/1986 | Itoh | 364/513 |
| 4,722,063 | 1/1988 | Yasukawa et al. | 364/513 |
| 4,725,965 | 2/1988 | Keenan | 364/513 |
| 4,731,856 | 3/1988 | Lloyd et al. | 382/8 |
| 4,763,276 | 8/1988 | Perreirra et al. | 364/513 |

OTHER PUBLICATIONS

Repeatability Measurements of a Vision Servoed Manipulator Using an Optoelectronic Remote 3-D Tracking System; Juberts; IEEE; pp. 948-955; 1985.

Primary Examiner—Allen MacDonald
Attorney, Agent, or Firm—Dorr, Carson, Sloan & Peterson

[57] ABSTRACT

A hierarchial calibration arrangement is used to provide ever-increasing levels of accuracy in positioning a robot arm end effectuator. A first level of positional calibration is the use of a home position to provide an approximate position of the robot arm end effectuator. Subsequent calibration operations provide a finer degree of positional accuracy of the robot arm end effectuator with a vision system being used to provide the most precise positioning of this apparatus. The final step in the calibration process occurs with each tape cartridge retrieval or replacement operation that is completed in the automated tape cartridge library system. Every tape cartridge storage cell in the library system contains a visual target for the final fine positioning of the robot arm end effectuator by the use of the vision element. The use of this hierarchial calibration process enables the robot arm to operate in a non-linear, non-uniform workspace.

21 Claims, 9 Drawing Sheets

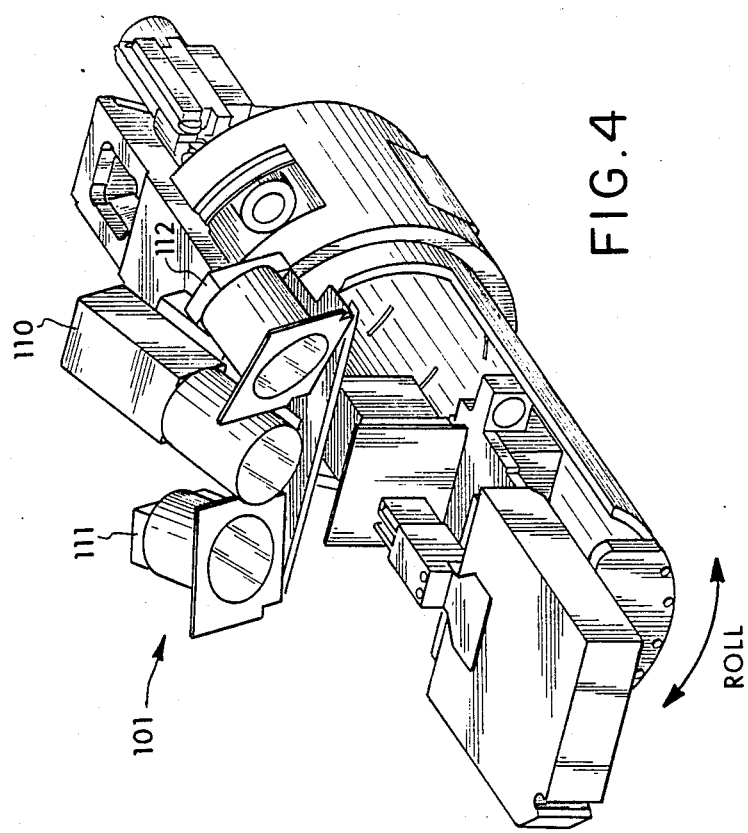

ROBOT ARM CALIBRATION SYSTEM

FIELD OF THE INVENTION

This invention relates to robot arm systems and, in particular, to a method of calibrating a robot arm in a series of hierarchally organized operations to provide a sequence of calibrations of ever-increasing positional accuracy.

PROBLEM

It is a problem in robot arm or manipulator systems to provide an accurate determination of the position of the end effectuator mechanism of the robot arm in relation to the workspace. Positional accuracy of the robot arm end effectuator affects both the repeatability of an operation as well as the ability of the robot arm to accurately perform the particular task required of it. There are many different robot arm calibration arrangements known in the art and all entail the use of some sort of sensor to determine the position of the robot arm. A common method of calibrating the position of the end effectuator of the robot arm is to use a vision system to orient the end effectuator of the robot arm with respect to a single base-line target located in the workspace. In these systems, the position of the end effectuator of the robot arm is calculated with respect to the single base-line target and a calculation is made of the offset between this target and the actual position of the robot. The problem with such an arrangement is that a single calibration with the vision system can only provide a certain level of accuracy in the positioning of the end effectuator of the robot arm and this accuracy is usually the fine positioning once the robot arm is in the vicinity of the workpiece. Such a position calibration arrangement is dependent on the fact that the workspace is rectilinear and uniform in all dimensions. Any significant deviations in the uniformity or linearity of the workspace are not accounted for in this particular position calibration arrangement which uses a single base-line target for the entire workspace.

SOLUTION

These problems are solved and a technical advance achieved in the field by the hierarchial robot position calibration apparatus of this invention. This position calibration arrangement consists of a series of calibration operations, each of which provides an everincreasing level of positional precision. This apparatus also compensates for nonlinearities and nonuniformities in the workspace for a robot arm with six degrees of motion.

The workspace in which the robot arm operates is an automated tape cartridge library system that consists of two concentrically arranged cylindrical arrays of tape cartridge storage cells. The robot arm is pivotally rotatable about the center of the concentrically arranged cylinders and contains a tape cartridge retrieval mechanism. This tape cartridge retrieval mechanism is located between the two concentrically arranged cylindrical arrays of tape cartridge storage cells for retrieving and replacing tape cartridges in the storage cells. The inner and outer cylindrical arrays of tape cartridge storage cells are arranged to be loaded from this common area between the two cylindrical arrays so that the tape cartridge retrieval mechanism accesses both cylindrical arrays from this common area.

The robot arm consists of a plurality of mechanisms. The robot arm is not anthropomorphic, in that it has no flexible joints, and there are no multidimensional moves. Each motion of the robot arm is independent of every other motion of the robot arm. This six motions of the robot arm are: theta-positioning in the circular direction; Z - positioning in the vertical direction; phi - positioning in a circular direction of the retrieval mechanism itself; and roll, reach and grab - wrist and finger (end effectuator) motions. The roll, reach and grab motions are respectively a 360 degree wrist-type movement, extension of the end effectuator from a home position to the cartridge retrieval position, and closing the fingers on the magnetic tape cartridge.

In order to calibrate this robot arm assembly, a hierarchial calibration arrangement is used to provide ever increasing levels of accuracy in positioning the robot arm end effectuator. A first level of position calibration is the use of a home position to provide an indication of the robot arm end effectuator position in the Z and theta directions. The next step in the calibration process is to align the roll and wrist mechanisms. This is accomplished by the use of a calibration target on the robot arm itself which enables the roll and the wrist mechanisms to be calibrated independent of the Z and theta calibrations. The calibration target is a wedge shaped block that is located a predetermined distance from the home position in the Z direction. The robot arm positions the end effectuator opposite this calibration target based on the home position and then activates the roll and wrist mechanism to operate the end effectuator to grab the wedge shaped target. This operation is accomplished so that the mechanical apparatus in the roll and wrist mechanism grabs the calibration target in a power-down mode. This causes the roll and wrist mechanism to align itself in relation to the calibration cell as the fingers of the end effectuator grab the alignment cell. The shaft encoders on the end of the roll and wrist servos are read at this point to obtain a new zero reference point, to thereby obtain relatively precise roll and wrist calibration.

The next calibration to take place is with the use of the vision system to provide a more precise calibration of the robot arm apparatus. The end effectuator of the robot arm is positioned in a calibration area wherein a vision calibration target is located. This vision calibration target contains a pair of L-shaped alignment targets, one located above the other and rotated clockwise 90 degrees with respect to the bottom target. The vision system detects the lower one of the two alignment targets and adjusts the position of the end effectuator with respect to this first of the two targets to obtain a theta and Z-direction alignmen . The roll mechanism is then used to rotate the end effectuator and vision system through a 90 degree clockwise rotation and the position of the robot arm end effectuator is again reset so that the second target is also in alignment. Thus, the two L-shaped targets should be in the same position whether viewed in the original direction or in a 90 degree clockwise roll direction. Once the targets line up in both directions, positioning of the robot arm end effectuator in the theta and Z directions is in perfect alignment.

The above-described alignment operations provide a high degree of positional accuracy of the robot arm apparatus. However, such alignment operations do not provide any compensation for nonuniformity of the workspace. Due to the fact that the cylindrical storage cell array is made up of a plurality of independent panels, the robot arm system must be calibrated with respect to each panel. This additional level of calibration is obtained by the use of one or more calibration targets located on each panel of tape cartridge storage cells. The position of the robot arm, using the vision system, is determined using the calibration targets on each panel in the tape cartridge storage cell array and stored in memory so that each panel is calibrated with respect to the robot arm in terms of skew, twist, horizontal and vertical misalignment.

A final calibration takes place with each tape cartridge storage cell that is accessed. The vision system aligns itself with respect to the L-shaped target that is located on each of the tape cartridge storage cells before the magnetic tape cartridge is retrieved or replaced in one of the tape cartridge storage cells.

In this fashion, a non-linear workspace which can be non-uniform in its alignment is calibrated with respect to a robot arm having six ranges of motion. The use of the various calibration operations provides ever-increasing accuracy of end effectuator position so that the robot arm can accurately position itself opposite any one of the plurality of tape cartridge storage cells in the entire automated tape cartridge library system.

BRIEF DESCRIPTION OF THE DRAWING

FIG. 4 illustrates a perspective view of the wrist/finger assembly of the robot arm;

DETAILED DESCRIPTION OF THE DRAWING

Figure 1:
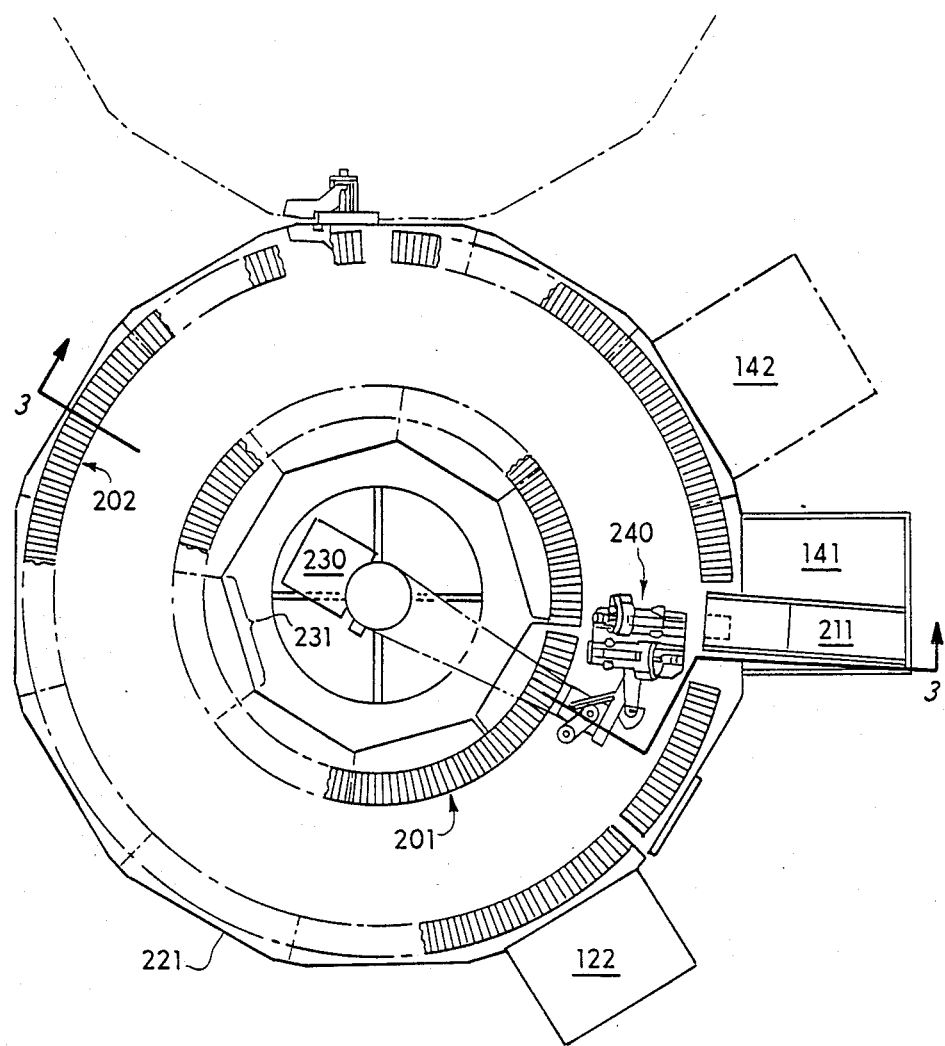
FIG. 1 illustrates a top view of the automated tape cartridge library module.
Figure 2:
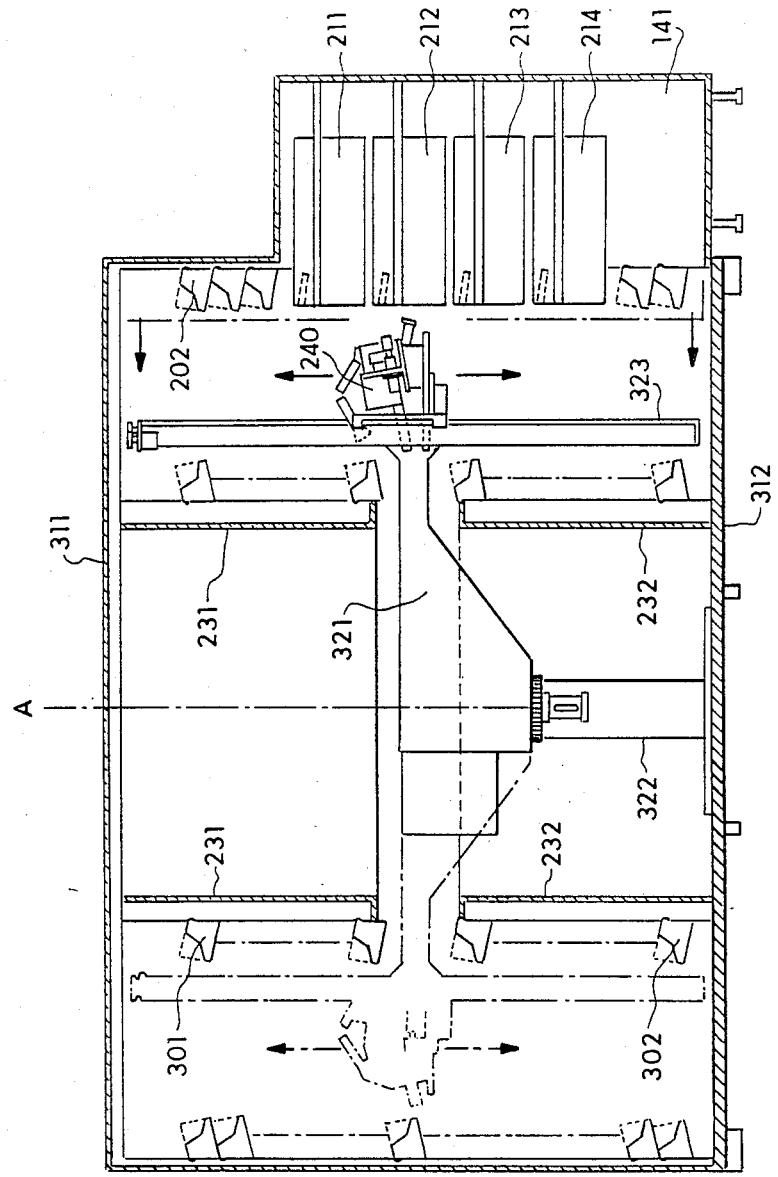
FIG. 2 illustrates a cutaway view of a library module with its associated robot arm mechanism and tape cartridge storage array.

FIG. 1 illustrates a top view of the automated tape cartridge library module with the ceiling removed, while FIG. 2 illustrates a cutaway side perspective view of the library module. The automated tape cartridge library module consists of a stand alone exterior housing which consists of a plurality of wall segments 221 attached to floor 312 and ceiling 311 plates and disposed about a vertical axis A. There is included an inner wall having a plurality of segments 231 forming upper portion which is suspended from a ceiling 311 of the library module and another plurality of like segments 232 forming a lower portion of the interior wall which is mounted on the floor plates 312 to support a first cylindrical array 201 of tape cartridge storage cells centered about the vertical axis A. A second cylindrical array of tape cartridge storage cells is concentrically arranged about the first cylindrical array 201 and mounted on the wall segments 221 of the outer housing. A configuration of the segments 221 of the outer wall housing are such that the resulting structure is the shape of a dodecahedron.

Tape Cartridge Storage Cells

Figure 6:
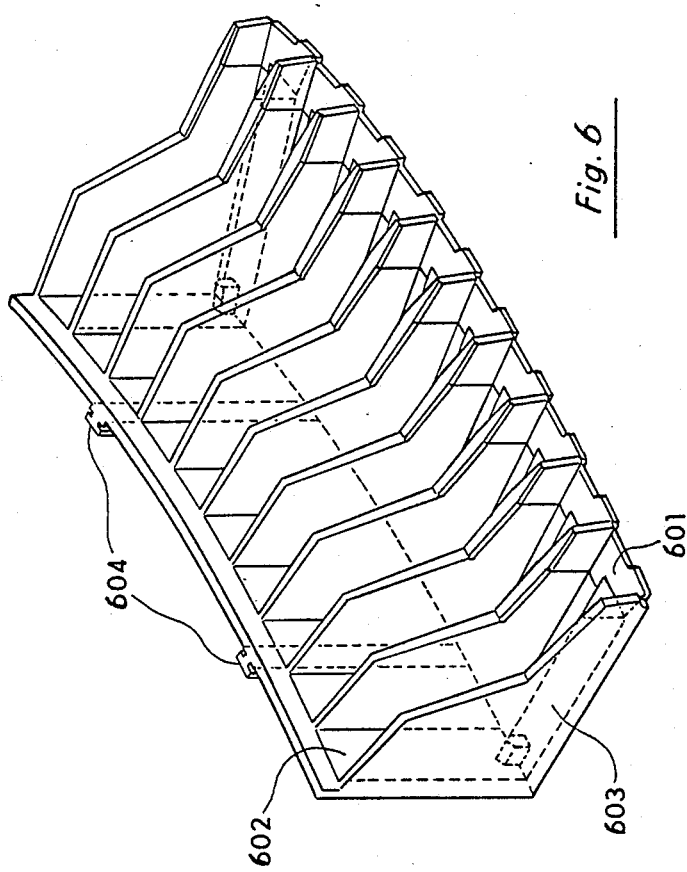
FIG. 6 illustrates the prospective view of the tape cartridge storage cells.

FIG. 6 illustrates in additional detail the arrangement of a particular array of tape cartridge storage cells. The array of tape cartridge storage cells illustrated in FIG. 6 has a radius of curvature adapted to be mounted in the inner cylindrical array 201 of tape cartridge storage cells of the automated tape cartridge library module. Tape cartridge storage cells on the outer cylindrical array 202 are formed with an opposite curvature. All of the tape cartridge storage cells in the inner 201 and outer 202 cylindrical arrays face each other so that the robot arm 230 can retrieve tape cartridges from either the inner 201 or the outer 202 cylindrical array.

The tape cartridge storage cells illustrated in FIG. 6 consist of a bottom portion 601, a back portion 602 with intervening wall segments 603 to provide a plurality of slots or cells for the storage of the tape cartridges. Bottom portion 601 of the tape cartridge storage cells is angled downward, front to back, so that a magnetic tape cartridge placed in the tape cartridge storage cell tends to slide along bottom portion 601 into the tape cartridge storage cell. The wall segments 603 are adapted for access by the wrist and finger assemblies 240 of the robot arm 230. In addition, attachment apparatus such as hooks 604 formed at the rear of the array of cells can be used to suspend the tape cartridge storage cells from the wall segments of the library module.

Robot Arm Details

Figure 3:
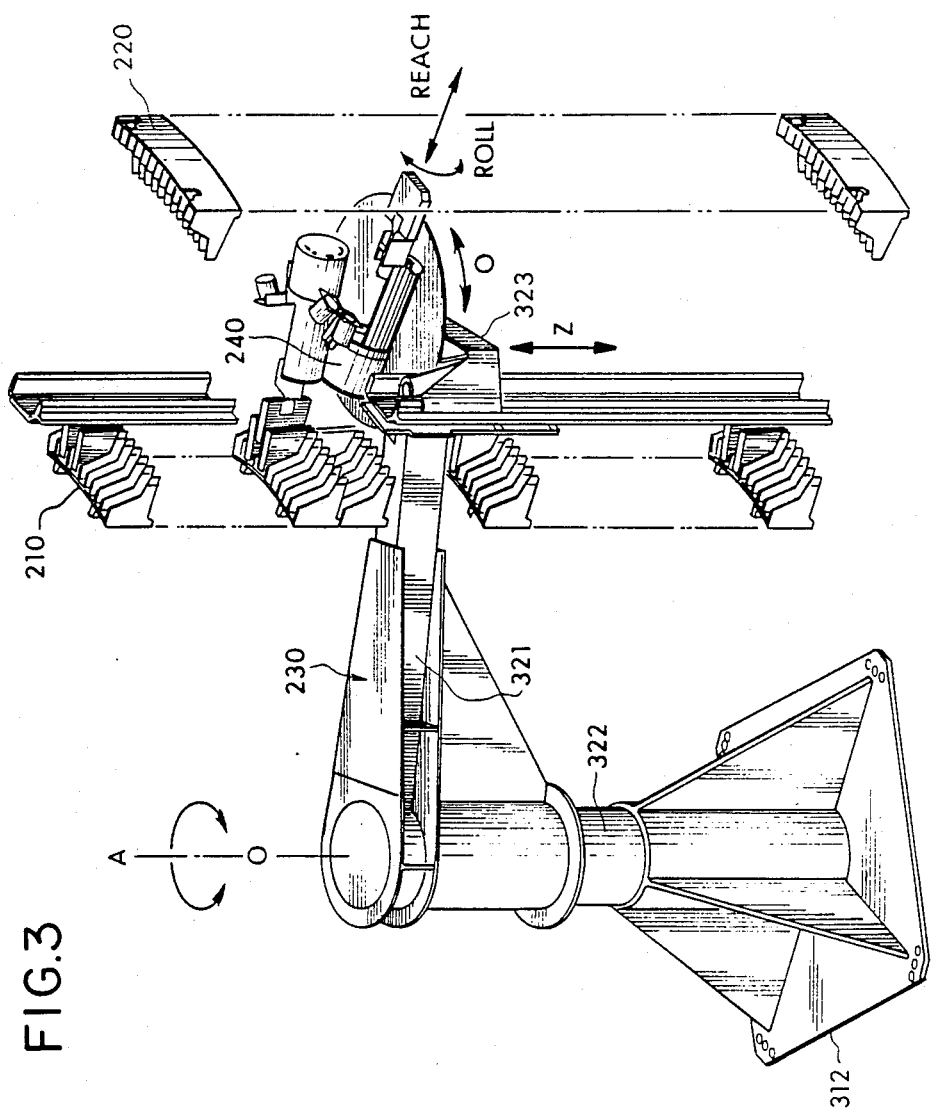
FIG. 3 illustrates a perspective view of the robot arm mechanism.

FIG. 3 illustrates a perspective view of the robot arm assembly. The robot arm 230 consists of an arm assembly including a theta arm 321 rotatably mounted on a support column 322 which is attached to the floor plates 312 of the automated tape cartridge library module. The arm assembly includes a Z mechanism 323 attached to the end of theta arm 321 remote from the support column 322. The Z mechanism 323 is coupled to a wrist and finger assembly 240 which performs the actual magnetic tape cartridge retrieval from the tape cartridge storage cell. The Z mechanism 323 provides a vertical range of motion for the wrist and finger assembly 240 to access various levels of the tape cartridge storage cell array. The theta arm 321 locates the Z mechanism 323 and its associated wrist and finger assembly 240 in the proper location to access both the inner 201 and outer 202 cylindrical arrays of tape cartridge storage cells. The robot arm support column 322 includes a motor which causes the theta arm 321 of robot arm 230 to rotate about the pivot point A of robot arm 230 so that wrist and finger assembly 240 can access all of the tape cartridge storage cells in the circular array about the pivot point A. Thus, the elements in the robot arm assembly 230 cooperatively operate to access each and every tape cartridge storage cell in the entire automated tape cartridge library module. The servo motors for each of the various ranges of motion in the robot arm assembly 230 are all controlled by a control unit (not shown) connected to the automated tape cartridge library module. Additional details of the robot arm mechanism are disclosed in copending application Ser. No. 007,047, filed Jan. 26, 1987. These details are not necessary for the understanding of the calibration process and are referred to as background information.

Vision System

The vision system 401 is located on the top of the wrist and finger assembly 240 and is focused on a point a predetermined distance in front of the wrist and finger assembly 240 when the wrist and finger assembly 240 is fully retracted. The point of focus of vision element 410 coincides with the position of a machinereadable readable label imprinted on the end of the magnetic tape cartridge stored in the magnetic tape cartridge storage cell. In order to enable vision element 401 to read the label on the magnetic tape cartridge, a source of illumination is provided. The source of illumination consists of a pair of lamps 411, 412 arranged one on either side of the vision element 410, and aligned in substantially the same orientation as vision element 410. The lamps 411, 412 are directed so that the light beams emanating from these two lamps 411, 412 cross at a point in the line of sight of the vision element 410, which point coincides with the position of the label on the end of the magnetic tape cartridge.

The two lamps serve to illuminate the label on the magnetic tape cartridge sufficiently so that vision element 410 can accurately read the machine-readable characters imprinted on the label. This vision system 401 as described above is also used for the purpose of calibrating the position of the end effectuator of the robot arm 230. An L-shaped target 605, 606 is provided on each cell of the tape cartridge storage cell array so that the vision system 401 can align the position of the robot arm 230 to be exactly opposite the magnetic tape cartridge stored in the tape cartridge storage cell. In addition, the vision system 401 is used to calibrate the position of the end effectuator by use of a special calibration target cell located in the magnetic tape cartridge library.

Robot Arm Calibration Process

The control unit consists of a computer and an associated memory. The memory contains the operational programs that control the various robot arm mechanisms. These programs include, for example, a routine to translate the identification of a particular tape cartridge storage cell by panel, row, column into control signals to activate the servo mechanism of the theta, Z, wrist and finger mechanisms to position the robot arm end effectuator opposite the designated tape cartridge storage cell. In addition, the control unit memory includes data identifying the results of each calibration operation described below. Further, a routine is included to scan the charge coupled devices that comprise vision element 410 and translate these outputs into target identification and position data. All of these above-described elements are not disclosed in further detail for the sake of simplicity since these implementation-specific details are not necessary for an understanding of the concepts of this invention. Such implementation-specific details can be devised in straightforward fashion by one skilled in the art based on the teachings of this invention.

Figure 8:
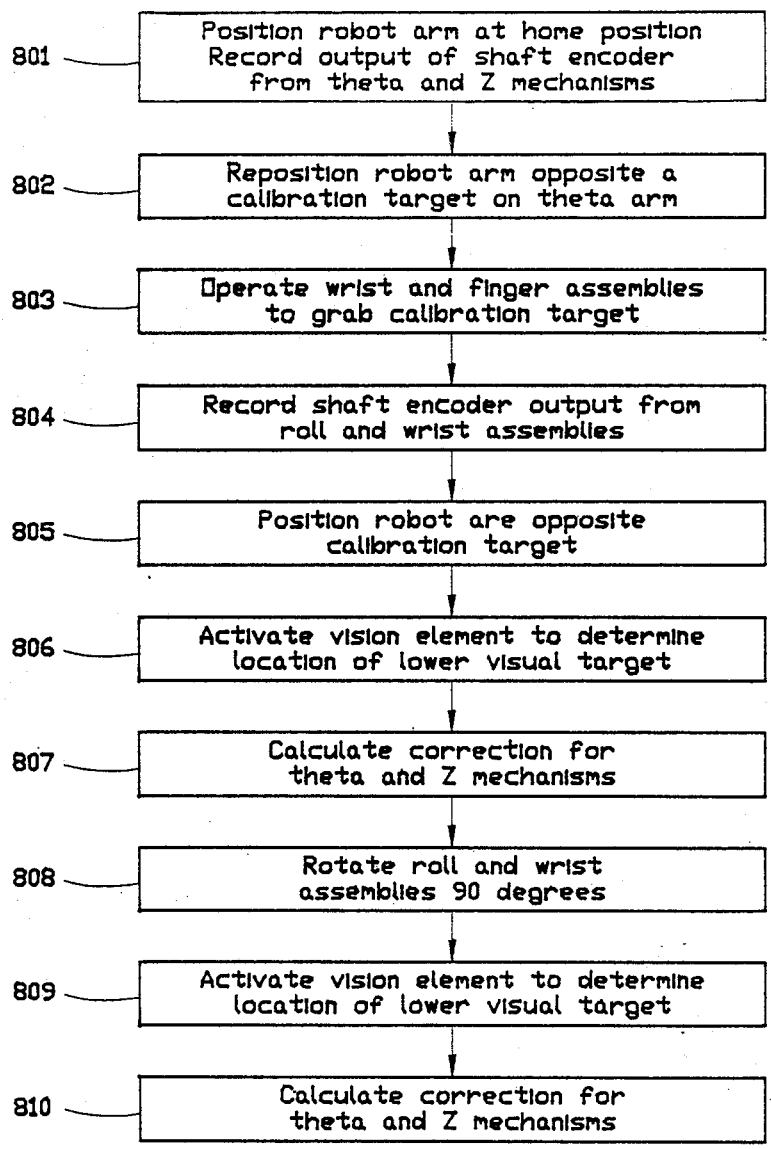
FIGS. 8–10 illustrate in flow diagram form the operational steps taken by the robot positioning calibration arrangement.

The basic calibration of the robot arm apparatus is illustrated in flow diagram form in FIG. 8. At step 801, the control unit of the automated tape cartridge library positions robot arm 230 at a predefined home position. The control unit reads the output of the shaft encoders on the servo mechanisms of the Z arm and the theta arm. The output from the shaft encoders are stored in memory in the control unit to indicate the base-line position of robot arm 230 in the theta and Z directions.

Once this operation is completed, the calibration process advances to step 802 where the control unit repositions the robot arm 230 opposite a calibration target which is located on theta arm 321. The location of this calibration target is selected to render this calibration independent of theta and Z positioning. Since the robot arm is not anthropomorphic, the calibration of the robot arm in any one direction is independent of the calibration of the robot arm in every other direction. This calibration target is in the same theta position and a predetermined distance in the Z direction from the home position that was used as a base-line calibration at step 801. The control unit positions the end effectuator of robot arm 230 consisting of wrist and finger assemblies 240 opposite the calibration target on the theta arm. At step 803, the control unit operates the wrist and finger assemblies 240 and the grip mechanism contained therein to grab the calibration target with the grip mechanism. This operation is performed with the wrist and roll mechanisms in a power-down mode to calibrate these two mechanisms. In particular, no current is applied to the servo mechanisms of the wrist and roll assemblies and the grip mechanism is used in a powered mode to securely grab the calibration target. By grabbing the calibration target, the grip mechanism pulls the wrist and roll mechanisms into perfect alignment with this calibration target. Once the target is securely grabbed by the grip mechanism, the shaft encoder outputs of the roll and wrist servo mechanisms are read at step 804 by the control unit. The output of the shaft encoders are stored in the control unit memory and provide an accurate position calibration for the roll and wrist assemblies.

The control unit in step 805 now proceeds to obtain a more precise calibration of the Z and theta mechanisms. The basic calibration of this mechanism was performed at step 801 by the use of the home position. This calibration is independent of the roll and wrist assembly calibration that occurred at steps 802 through 804. The control unit positions the vision system 410 of robot arm 230 opposite the calibration target. At step 806, the control unit activates the vision element 410 that is located on the wrist and finger assemblies 240 to read the visual target in the calibration target.

Calibration Targets

Figure 7:
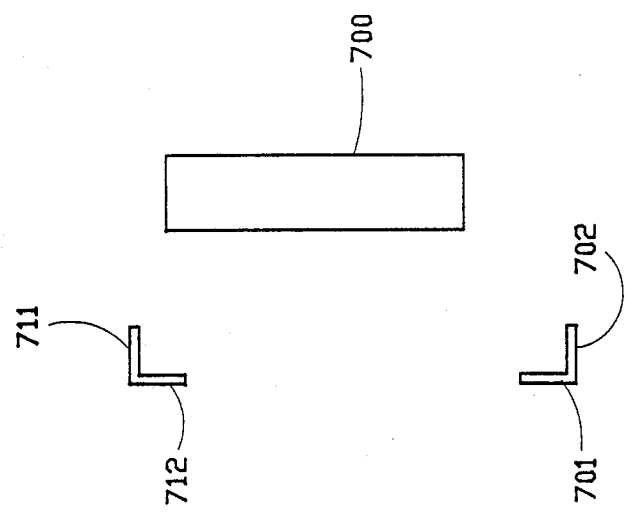
FIG. 7 illustrates the calibration target details.
Figure 5:
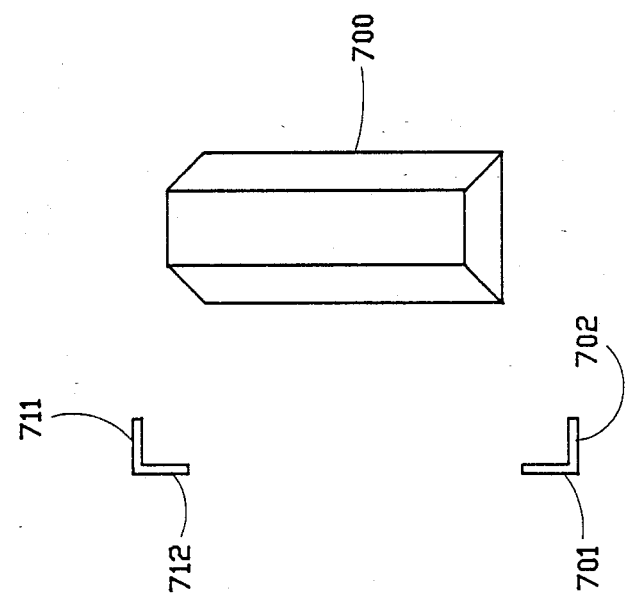
FIG. 5 illustrates the grip calibration target cell.

FIG. 7 illustrates the details of the calibration target storage cell for the robot arm assembly 230. The calibration target storage cell consists of a rectangular target 700 the size and shape of a magnetic tape cartridge. On one side and positioned above 711, 712 and below 701, 702 this rectangular target is a pair of L-shaped visual indicator targets. These two L-shaped targets are equidistant from the center of the rectangular magnetic tape cartridge shaped target 700. The robot arm 230 positions the vision system 401 opposite this calibration target at step 805 and measurements are made using the vision system 401 charge coupled device array of photo detectors 410 to accurately position the robot arm 230 with respect to the calibration target 701, 702 in the lower left hand corner of FIG. 7 at step 806. The horizontal 702 and vertical 701 bars of this particular target provide horizontal and vertical alignment of the end effectuator of the robot arm 230 by use of the vision system 401. At step 807, the calculated calibration corrections for the Z and theta directions are stored in the control unit memory. Once this calibration is accomplished, the entire roll and wrist mechanism 240 at the end of the robot arm 230 is rotated 90 degrees at step 808 so that the target 711, 712 in the upper left hand corner of FIG. 7 now appears in the lower left hand corner of the field of vision of the vision element 410 at step 809. This target 711, 712 should be in the identical position as the previous target 701, 702 viewed by the vision system 401. If so, then the robot arm 230 position is accurately aligned and no further calibration takes place. If the second L-shaped target 711, 712 does not match the exact position of the first L-shaped target 701, 702 previously aligned to, further calibration takes place at step 810 to guarantee that both targets appear in the same position in the field of view of the vision element 410 when the end assembly is rotated through its 90 degree motion.

Workspace Calibration

Figure 9:
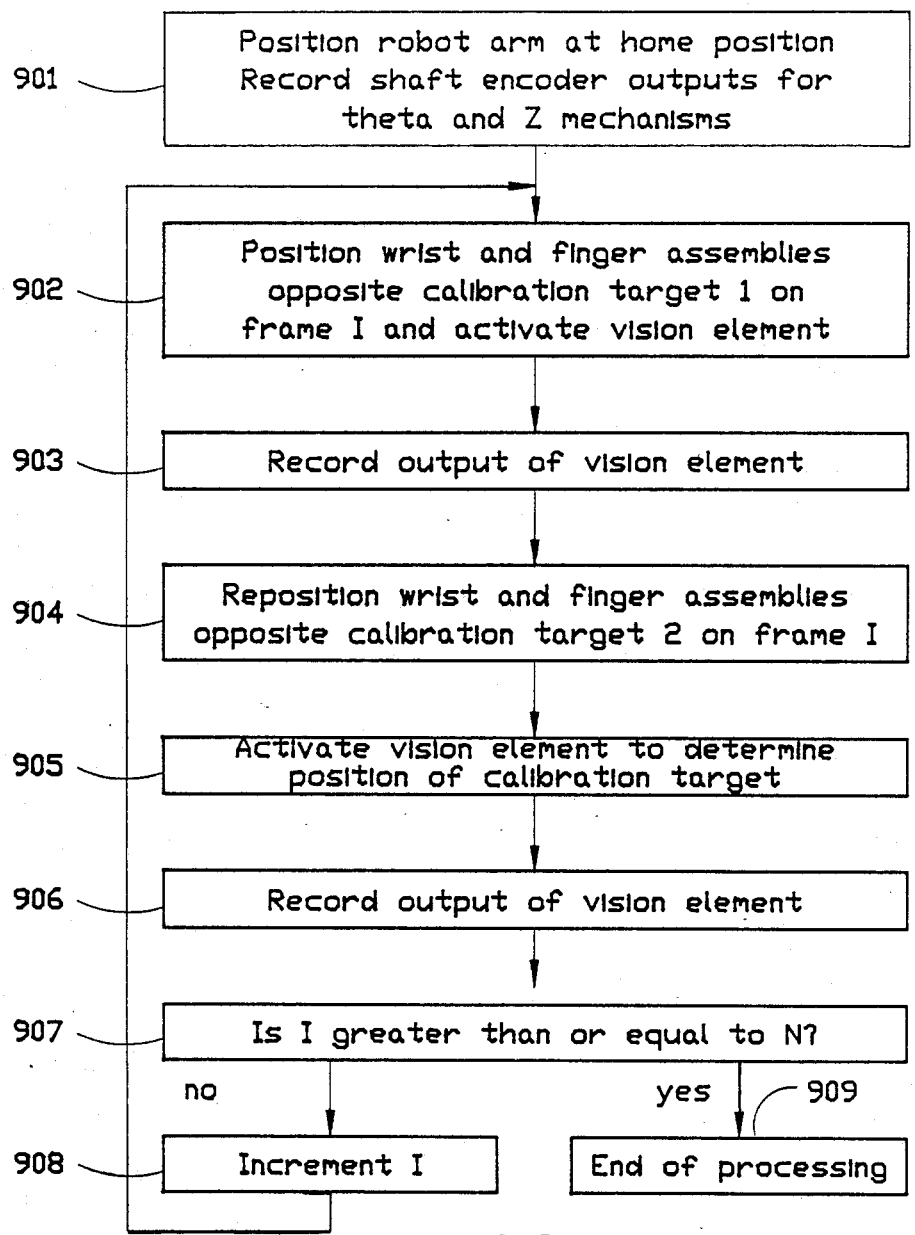
Figure 10:
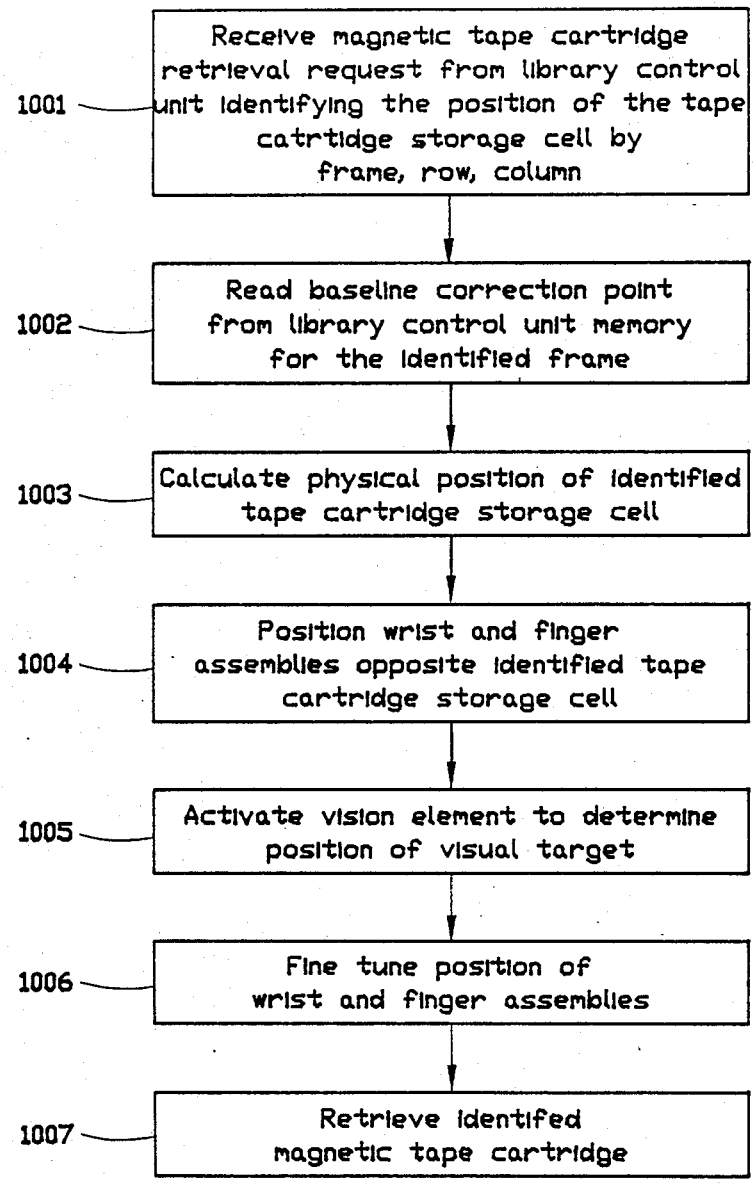

The above-described calibration process accurately positions the robot arm 230 and wrist and finger assemblies 240. However, the cylindrical arrays 201, 202 of tape cartridge storage cells consist of a plurality of frames of tape cartridge storage cells. Each of these frames is attached to either the external or the interior housing of the tape cartridge library module. The position of each of these frames of tape cartridge storage cells with respect to the home position of the robot arm can vary. Therefore, the process outlined in FIG. 9 provides for the calibration of each frame in the two cylindrical arrays 201, 202 of tape cartridge storage cells. This process begins at step 901 where the robot arm 230 is positioned at the home position and the shaft encoder outputs for the theta and Z mechanisms are recorded in the control unit memory. At step 902, the control unit positions the wrist and finger assemblies 240 of robot arm 230 opposite a predetermined calibration target 1 on frame I, where I is a variable that goes from 1 to N where N is the number of independent frames located in a particular library module. At step 902, the control unit activates vision element 410 to determine the actual position of the visual target 1 that is located on frame I. At step 903 the output of the vision element 410 is recorded in the control unit memory to accurately provide a base line position of target 1 of frame I. At step 904 the control unit repositions the wrist and finger assemblies 240 of robot arm 230 at target 2 of frame I. At step 905, the control unit again activates vision element 410 to determine the position of visual target 2 of frame I. At step 906 the output of the vision element 410 is stored in the control unit memory to accurately record the position of visual target 2 of frame I.

By providing two visual targets on a particular frame, the control unit can accurately complete the position of each tape cartridge storage cell in its particular frame. The tape cartridge storage cells are indexed by frame, row and column. By use of the base line visual target process, the orientation of the entire frame is measured by the control unit and with this information the position of each tape cartridge storage cell in each row and column can be calculated by the control unit. The positioning of the two targets on a particular frame must be such that this would provide an accurate measurement of the spacial relationship of the frame with respect to the robot arm home position. A likely selection of the positioning of these targets would be for example on opposite ends of the particular frame. These end points would then provide the control unit with the definition of the meets and bounds of this particular frame.

Once the process of calibrating the position of this particular frame is completed, control unit advances to step 907 where it determines whether the variable I is greater than or equal to constant N which represents the number of frames in the particular library module. If I is not greater than or equal to N, the variable I is incremented at step 908 and processing returns to step 902 where the positional calibration process is repeated for the next frame in a particular library module. Thus, frame by frame, the position of each frame in the entire library module is measured, thereby providing the control unit with an accurate positional calibration of every tape cartridge storage cell in the entire library module. Once the frame by frame calibration process has been completed, and I is greater than or equal to N in step 907, processing advances to step 909 where this calibration process ends.

This frame by frame calibration process is particularly pertinent for the inner cylindrical array of tape cartridge storage cells. This inner array actually comprises an upper and a lower portion of tape cartridge storage cells. Thus, the upper and lower arrays can be misaligned with respect to each other in a rotational skew or a vertical or tilt mispositioning. Therefore, for the inner cylindrical array of tape cartridge storage cells each frame is determined to consist of two segments, an upper segment and a lower segment and the process of calibrating a frame is repeated for the upper segment and the lower segment using two visual targets for each of these segments.

Final Positional Calibration

The above-described processes provide calibration of the robot arm assembly itself as well as of the work space in which the robot arm operates. A final fine tuning calibration takes place with each tape cartridge retrieval operation that the automated tape cartridge library completes. This process begins at step 1001, where the control unit receives a tape cartridge retrieval request from the automated tape cartridge library system. This tape cartridge retrieval request identifies the position of the tape cartridge storage cell in which the designated tape cartridge resides. This positional identification is by frame, row and column. Thus, the control unit of the library module must translate the frame number, row number and column number into actual positional measurements so that the wrist and finger assemblies 240 of robot arm 230 can be positioned opposite the designated tape cartridge storage cell. This is accomplished at step 1002 where the control unit reads the base line calibration points from its memory for the identified frame. These base line calibration points were determined in the process described in steps 902 to 906 as described above. These base line calibration points are then used at step 1003 by the control unit to calculate the physical position of the identified tape cartridge storage cell. The base line calibration points are used to identify the position of each row and column in this frame. Using this information, the designated row and designated column that identifies the position of this tape cartridge storage cell can be calculated and used by the control unit to position the wrist and finger assembly 240 of robot arm 230 opposite the identified tape cartridge storage cell at step 1004. The control unit at step 1005 then activates vision element 410 to determine the position of the vision target that is part of each tape cartridge storage cell in the library module. At step 1006, the vision element is read out to provide a fine tuning of the position of the wrist and finger assembly 240 based on the position of the vision target on this tape cartridge storage cell. The fine positioning information is used by the control unit to activate the servo mechanisms on the Z, theta, wrist and finger mechanisms to precisely align the gripper mechanism opposite the designated tape cartridge. Once this fine position adjustment has been accomplished in well known fashion, the control unit at step 1007 signals the grip mechanism to retrieve the identified tape cartridge. This completes the alignment process and this entire process is repeated by the control unit when the identified tape cartridge is to be placed in its designated destination. Thus, if the tape cartridge is to be placed in another tape cartridge storage cell, the fine positioning calibration operation described above for steps 1001 to 1007 is repeated for this destination tape cartridge storage cell. The only difference with this process is that step 1007 is not a tape cartridge retrieval operation but it is a tape cartridge deposit operation.

Thus, the above description provides an indication of the method of calibrating the robot arm mechanism using a home position, a target cartridge that is used to calibrate the robot arm by a mechanical grip operation as well as the plurality of visual targets that are used in conjunction with the vision system on the wrist and finger assembly to provide fine positioning of the robot arm end effectuator mechanism. This calibration process is a hierarchial process as is described above, with each calibration operation in the sequence providing additional fine tuning of the previous calibration so that the final step of the process provides a highly accurate positional determination. The use of a hierarchial calibration process enables each step of the process to provide a certain amount of redundancy for all of the other calibration steps. Therefore, a single miscalibration in this process will not have disastrous results but will be corrected by a subsequent step in the calibration process. No single base line calibration operation is required to have the ultimate precision for the entire mechanism but provides a rough estimate of the position of the robot arm end effectuator. The vision system with its ability to provide a more precise positional definition, is used for the fine calibration of the robot arm assembly. In addition, this process of calibration enables the robot arm to operate in a non-linear, nonuniform work space. Thus, each frame in the entire library module need not be in precise alignment with an adjacent frame or even with the home position of the robot arm assembly. This capability of having each frame independently aligned enables the library module to be assembled in a more cost efficient manner than if precise alignment of every segment of the tape cartridge storage cell array had to be precisely aligned with every other segment of the tape cartridge storage cell array.

While a specific embodiment of the robot arm calibration system has been disclosed for illustrative purposes, it is expected that other arrangements can be devised by those skilled in the art and within the scope of the appended claims. There is no intention to limit the scope of the appended claims by the use of this particular description of the preferred embodiment of the invention.

I claim:

1. In a robot arm system, where said robot arm includes an end effectuator with an associated vision system, a method of calibrating said robot arm comprising the steps of:
    storing a sequence of independent calibration operations, with each sequential calibration operation having a greater positional accuracy than the preceding operation;
    executing said stored sequence of calibration operations, wherein said stored sequence of calibration operations includes:
        positioning said end effectuator opposite a two-dimensional vision calibration target;
        activating said vision system to scan said two-dimensional vision calibration target;
        repositioning said end effectuator based on the output of said vision system scan of said two-dimensional vision calibration target;
        maintaining said vision system opposite said two-dimensional vision calibration target;
        activating said vision system to rescan said two-dimensional vision calibration target; and
        repositioning said end effectuator based on the output of said vision system rescan of said two-dimensional vision calibration target.

2. In the method of claim 1, where said robot arm includes an end effectuator that retrieves/replaces objects in storage locations, and a vision system associated with said end effectuator, said sequence of independent calibration operations including the steps of:
    positioning said robot arm end effectuator opposite a selected one of said storage locations;
    activating said vision system to scan a calibration target associated with said storage location;
    repositioning said end effectuator based on the position of said scanned associated calibration target as determined by said vision system; and
    repeating said steps of sequentially positioning, activating and recording for every work area in said workspace.

3. In a robot arm system, where said robot arm includes an end effectuator and an associated vision system, where said robot arm operates in a nonuniform workspace comprising a plurality of work areas that are not precisely aligned with each other, a method of calibrating said robot arm comprising the steps of:
    storing a sequence of independent calibration operations, with each sequential calibration operation having a greater positional accuracy than the preceding operation;
    executing said stored sequence of calibration operations, wherein said sequence of calibration operations includes:
        sequentially positioning said end effectuator opposite each of two or more calibration targets in one of said work areas;
        activating said associated vision system at each of said calibration targets; and
        recording the position of each of said calibration targets as determined by said vision system.

4. In a robot arm system, wherein said robot arm includes an end effectuator consisting of roll, wrist, reach and grab mechanisms, a method of calibrating said robot arm comprising the steps of:
    storing a sequence of independent calibration operations, with each sequential calibration operation having a greater positional accuracy than the preceding operation; and
    executing said stored sequence of calibration operations, wherein said sequence of calibration operations includes:
        positioning said end effectuator opposite a calibration target that consists of a solid graspable object;

powering down said roll and wrist mechanisms;
activating said reach and grab mechanisms to grasp said solid graspable object; and
recording the position of said roll and wrist mechanisms as a result of said grasp operation.

5. In a robot arm system, where said robot arm includes an end effectuator with an associated vision system, a method of calibrating said robot arm comprising the steps of:
storing a sequence of independent calibration operations, with each sequential calibration operation having a greater positional accuracy than the preceding operation;
executing said stored sequence of calibration operations, wherein said sequence of calibration operations includes:
mechanically calibrating said robot arm using said end effectuator; and
visually calibrating said robot arm using said vision system independent of said mechanical calibration.

6. In a robot arm system, where said robot arm includes an end effectuator with an associated vision system, a method of calibrating said robot arm comprising the steps of:
storing a sequence of independent calibration operations, with each sequential calibration operation having a greater positional accuracy than the preceding operation;
executing said stored sequence of calibration operations;
mechanically calibrating said robot arm using said end effectuator; and
subsequently calibrating said robot arm using said vision system independent of said mechanical calibration and with greater positional accuracy than said mechanical calibration.

7. In a robot arm system, where said robot arm is a non-anthromorphic mechanism consisting of two or more non-interactive mechanisms, a method of calibrating said robot arm comprising the steps of:
storing a sequence of independent calibration operations, with each sequential calibration operation having a greater positional accuracy than the preceding operation;
executing said stored sequence of calibration operations;
sequentially performing an initial calibration operation on each of said two or more non-interactive mechanisms; and
performing additional calibration operations on at least one of said two or more non-interactive mechanisms when all of said two or more non-interactive mechanisms have been initially calibrated.

8. In the method of claim 7, where said robot arm includes an end effectuator with an associated vision system, said step of sequentially performing comprises a mechanical calibration operation.

9. In the method of claim 8, where said step of performing comprises a visual calibration, using said vision system.

10. In the method of claim 8, said step of sequentially performing includes grasping a calibration target object, having a predetermined position, with said end effectuator.

11. In a robot arm system having an end effectuator with an associated vision system, wherein said robot arm includes an end effectuator consisting of roll, wrist, reach and grab mechanisms, a method of calibrating the position of said end effectuator comprising the steps of:
storing a hierarchial sequence of independent calibration operations;
executing all of said calibration operations on a first level of said hierarchy, including the steps of:
locating a home position for said robot arm;
recording the position of said robot arm;
positioning said end effectuator opposite a calibration target that consists of a solid graspable object;
powering down said roll and wrist mechanisms;
activating said reach and grab mechanisms to grasp said solid graspable object; and
recording the position of said roll and wrist mechanisms as a result of said grasp operation, and
repeating said step of executing for each subsequent level of said hierarchy.

12. In a robot arm system having an end effectuator with an associated vision system, a method of calibrating the position of said end effectuator comprising the steps of:
storing a hierarchial sequence of independent calibration operations;
executing all of said calibration operations on a first level of said hierarchy including the step of:
visually calibrating said robot arm using said vision system; and
repeating said step of executing for each subsequent level of said hierarchy.

13. The method of claim 12 wherein said step of visually calibrating includes the steps of:
positioning said end effectuator opposite a twodimensional vision calibration target;
activating said vision system to scan said twodimensional vision calibration target;
repositioning said end effectuator based on the output of said vision system scan of said two-dimensional vision calibration target;
rotating said vision system 90 degrees with respect to said position opposite said two-dimensional vision calibration target for said step of scanning;
activating said vision system to rescan said twodimensional vision calibration target; and
repositioning said end effectuator based on the output of said vision system rescan of said two dimensional vision calibration target.

14. In the method of claim 12, where said robot arm operates in a nonuniform workspace comprising a plurality of work areas that are not precisely aligned with each other, said step of visually calibrating including the steps of:
sequentially positioning said end effectuator opposite each of two or more calibration targets in one of said work areas;
activating said associated vision system at each of said calibration targets; and
recording the position of each of said calibration targets as determined by said vision system.

15. The method of claim 14 further including the step of:
repeating said steps of sequentially positioning, activating and recording for every work area in said workspace.

16. In the method of claim 12, where said robot arm includes an end effectuator that retrieves/replaces objects in storage locations, and a vision system associated with said end effectuator, said step of visually calibrating including the steps of:

positioning said robot arm end effectuator opposite a selected one of said storage locations;

activating said vision system to scan a calibration target associated with said storage location; and repositioning said end effectuator based on the position of said scanned associated calibration target as determined by said vision system.

17. In a non-anthromorphic robot arm system consisting of two or more non-interactive mechanisms and having an end effectuator with an associated vision system, a method of calibrating the position of said end effectuator comprising the steps of:

initially calibrating each of said two or more non-interactive mechanisms using mechanical calibrations consisting of:

locating a home position for one or more of said two or more non-interactive mechanisms, grasping a graspable calibration target object with said end effectuator;

calibrating one or more of said two or more non-interactive mechanisms using said vision system when said initial calibrations are completed comprising the steps of:

positioning said end effectuator opposite a vision calibration target, activating said vision system to determine the position of said vision calibration target, recording the position of said vision calibration target, rotating said vision system 90 degrees from the position of said positioning step, reactivating said vision system to determine the position of said vision calibration target, recording the position of said vision calibration target, positioning said end effectuator opposite a designated storage location in response to a request to retrieve/replace an object in said designated storage location, activating said vision system to determine the position of a vision target associated with said storage location, and repositioning said end effectuator based on the position of said associated vision target as determined by said vision system.

18. Apparatus for calibrating a robot arm comprising:
means for mechanically determining the position of said robot arm;
means for visually determining the position of said robot arm, subsequent to and independent of said mechanical determination; and
means for calibrating said arm based on said determined positions.

19. The apparatus of claim 18, where said robot arm includes an end effectuator with a reach and grasp mechanism, said mechanically determining means including:

a graspable target object having a predetermined position;

means for positioning said end effectuator opposite said target object;

means for activating said end effectuator to grasp said target object with said reach and grasp mechanism, with the remaining mechanisms of said robot arm in a power down mode; and means for recording the position of said robot arm.

20. The apparatus of claim 18, where said robot arm includes an end effectuator with an associated vision system, said visually determining means including:

a vision calibration target having at least one two dimensional target thereon;

means for positioning said end effectuator opposite said vision calibration target;

means for activating said vision system to determine the position of said vision calibration target;

means for rotating said vision system 90 degrees from said position opposite said vision calibration target; and means for activating said vision system to determine the position of said vision calibration target.

21. The apparatus of claim 20 further including:
means responsive to a signal to retrieve/replace an object in a storage location for positioning said end effectuator opposite said storage location as determined from said vision calibration target positions;

means for activating said vision system to determine the position of a vision target associated with said storage location; and means responsive to said determined position of said associated vision target for repositioning said end effectuator.

* * * * *